(12) United States Patent
Liao et al.

(10) Patent No.: US 12,617,032 B2
(45) Date of Patent: May 5, 2026

(54) SYSTEMS AND METHODS FOR CONTROLLING WAFER BREAKAGE DURING INGOT SLICING OPERATIONS

(71) Applicant: GlobalWafers Co., Ltd., Hsinchu (TW)

(72) Inventors: Jung-Chiang Liao, Zhubei City (TW); Yi-Chun Chou, Zhubei City (TW); Liang-Chin Chen, Zhubei City (TW); Chin-Yu Chang, Hsinchu City (TW); Ming-Tao Chia, Zhubei City (TW); Peter D. Albrecht, O'Fallon, MO (US)

(73) Assignee: GlobalWafers Co., Ltd., Hsinchu (TW)

( * ) Notice: Subject to any disclaimer, the term of this patent is extended or adjusted under 35 U.S.C. 154(b) by 242 days.

(21) Appl. No.: 18/356,362

(22) Filed: Jul. 21, 2023

(65) Prior Publication Data

US 2025/0025951 A1 Jan. 23, 2025

(51) Int. Cl.
B23D 57/00 (2006.01)

(52) U.S. Cl.
CPC .............................. B23D 57/0023 (2013.01)

(58) Field of Classification Search
CPC ..... B28D 5/045; B28D 5/0082; B28D 5/0076
USPC ....... 83/13, 651.1; 125/12, 35, 13.01, 16.02, 125/16.03; 156/268, 510, 64, 273, 257
See application file for complete search history.

(56) References Cited

U.S. PATENT DOCUMENTS

| | | | |
|---|---|---|---|
| 5,715,807 A | 2/1998 | Toyama et al. | |
| 5,735,258 A | 4/1998 | Okuno et al. | |
| 5,893,308 A * | 4/1999 | Katamachi | B23Q 16/001 83/13 |
| 6,923,171 B2 | 8/2005 | Hammer et al. | |
| 7,311,101 B2 | 12/2007 | Nakashima | |
| 2004/0083863 A1* | 5/2004 | Nakashima | B28D 5/045 83/13 |
| 2006/0060180 A1* | 3/2006 | Nakashima | B28D 5/0082 125/21 |

FOREIGN PATENT DOCUMENTS

| | | | | |
|---|---|---|---|---|
| CN | 113771247 A | 12/2021 | | |
| JP | 2001026013 A | 1/2001 | | |
| JP | 2004001409 A | 1/2004 | | |
| JP | 7045676 B1 * | 4/2022 | | B24B 19/02 |

OTHER PUBLICATIONS

International Search Report and Written Opinion issued in PCT/US2023/086028 mailed on Mar. 22, 2024; pp. 1-23.

* cited by examiner

*Primary Examiner* — Ghassem Alie
(74) *Attorney, Agent, or Firm* — Armstrong Teasdale LLP

(57) ABSTRACT

A system for slicing wafers from a monocrystalline semiconductor ingot includes a wire saw, a bond beam, the monocrystalline semiconductor ingot, and two sacrificial disks. The wire saw includes a wire web and wire guides operable to drive the wire web during a slicing operation. The bond beam is connected to the wire saw. The wire saw is operable to move the bond beam in a movement direction towards the wire web during the slicing operation to slice the wafers from the ingot. The ingot includes longitudinal end faces and a circumferential edge extending between the longitudinal end faces. The ingot is attached to the bond beam along the circumferential edge. One sacrificial disk is positioned adjacent each of the longitudinal end faces of the ingot to inhibit uncontrolled breakage of the wafers during the slicing operation.

20 Claims, 8 Drawing Sheets

SYSTEMS AND METHODS FOR CONTROLLING WAFER BREAKAGE DURING INGOT SLICING OPERATIONS

FIELD

This disclosure relates generally to wire saw processes used to slice monocrystalline semiconductor ingots into wafers and, more specifically, to systems and methods for controlling breakage of wafers sliced from an ingot during a wire saw process.

BACKGROUND

Single crystal silicon, which is the starting material for most processes for the fabrication of many electronic components such as semiconductor devices and solar cells, is commonly prepared by batch Czochralski (CZ) or Continuous Czochralski (CCZ) methods. In these methods, a polycrystalline source material, such as polycrystalline silicon ("polysilicon"), in the form of solid feedstock material is charged to a quartz crucible and melted, a single seed crystal is brought into contact with the molten silicon or melt, and a single crystal (or monocrystalline) silicon ingot is grown by slow extraction.

Monocrystalline silicon wafers may be sliced from a monocrystalline silicon ingot using a wire saw machine. The ingot is connected to a structure of the wire saw by a bond beam and an ingot holder. The ingot is bonded along its circumferential edge with adhesive to the bond beam. The bond beam is in turn bonded with adhesive to the ingot holder. The ingot holder is connected by any suitable fastening system to the wire saw structure. The ingot is suspended from or "hangs" from the bond beam and the ingot holder in the wire saw, such that the longitudinal end faces of the ingot extend perpendicular to the bond beam.

During a slicing operation, the circumferential edge of the ingot is contacted by a web of moving or translating wires in the wire saw that slice the ingot into silicon wafers. Silicon wafers sliced from proximate the longitudinal end faces of the ingot may be inadvertently damaged or experience uncontrolled wafer breakage during the wire saw operation. Wafer breakage during the wire saw operation reduces the number of wafers produced from the ingot, creates manufacturing inefficiencies, increases costs, and decreases wafer yield. Accordingly, there exists a need for practical, cost-effective systems and methods that facilitate reducing or eliminating wafer damage or breakage during a wire saw operation.

This section is intended to introduce the reader to various aspects of art that may be related to various aspects of the disclosure, which are described and/or claimed below. This discussion is believed to be helpful in providing the reader with background information to facilitate a better understanding of the various aspects of the present invention. Accordingly, these statements are to be read in this light, and not as admissions of prior art.

SUMMARY

One aspect is a system for slicing wafers from a monocrystalline semiconductor ingot. The system includes a wire saw that includes a wire web and wire guides operable to drive the wire web during a slicing operation. The system also includes a bond beam connected to the wire saw. The wire saw is operable to move the bond beam in a movement direction towards the wire web during the slicing operation to slice the wafers from the ingot. The system also includes the monocrystalline semiconductor ingot. The ingot includes longitudinal end faces and a circumferential edge extending between the longitudinal end faces. The ingot is attached to the bond beam along the circumferential edge. The system also includes two sacrificial disks. One sacrificial disk is positioned adjacent each of the longitudinal end faces of the ingot to inhibit uncontrolled breakage of the wafers during the slicing operation.

Another aspect is a method of slicing wafers from a monocrystalline semiconductor ingot. The method includes attaching a circumferential edge of the ingot to a bond beam and positioning sacrificial disks adjacent longitudinal end faces of the ingot. One sacrificial disk is positioned adjacent each of the longitudinal end faces. The method also includes connecting the bond beam to a wire saw that includes a wire web and performing a slicing operation on the ingot by operating the wire saw to drive the wire web and move the bond beam and the ingot in a movement direction towards the wire web to slice the wafers from the ingot. The sacrificial disks operate to inhibit uncontrolled breakage of the wafers during the slicing operation.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Systems and methods of this disclosure facilitate inhibiting (e.g., controlling, limiting, or preventing) uncontrolled breakage of wafers during a slicing operation performed on a monocrystalline semiconductor ingot using a wire saw. The systems and methods increase the number of wafers produced by the slicing operation that are suitable for use in subsequent processing and device fabrication, which reduces manufacturing inefficiencies, costs, and yield loss. Without being bound to a particular theory, wafers sliced from an ingot may experience stresses along relatively weak crystal planes (also referred to as cleavage planes) during the slicing operation. The stresses experienced in the wafers sliced from proximate the longitudinal ends ("longitudinal end wafers") of the ingot may cause these wafers to break along the cleavage planes. The longitudinal end wafers have less support to compensate for or otherwise offset the stresses, as compared to wafers sliced from proximate a center bulk region of the ingot.

The example systems and methods described include sacrificial disks that are each positioned adjacent one of the longitudinal ends of the ingot during the slicing operation. The sacrificial disks provide longitudinal support to the longitudinal end wafers and compensate for and/or offset the stresses experienced in these wafers during the slicing operation. The sacrificial disks thus facilitate inhibiting uncontrolled breakage of the longitudinal end wafers during the slicing operation. Moreover, the sacrificial disks may suitably be made of a semiconductor material (e.g., single crystal silicon) that provides greater rigidity to the disks and better support to the longitudinal end wafers. The semiconductor material may suitably be compatible with a slurry used during the slicing operation and does not substantially affect the quality of the slurry, thereby enabling the slurry to be recycled for subsequent slicing operations. Single crystal semiconductor material (e.g., single crystal silicon) may suitably be used for the sacrificial disks to reduce any impurities that may be introduced into the single crystal ingot by the adjacent disks.

Figure 1:
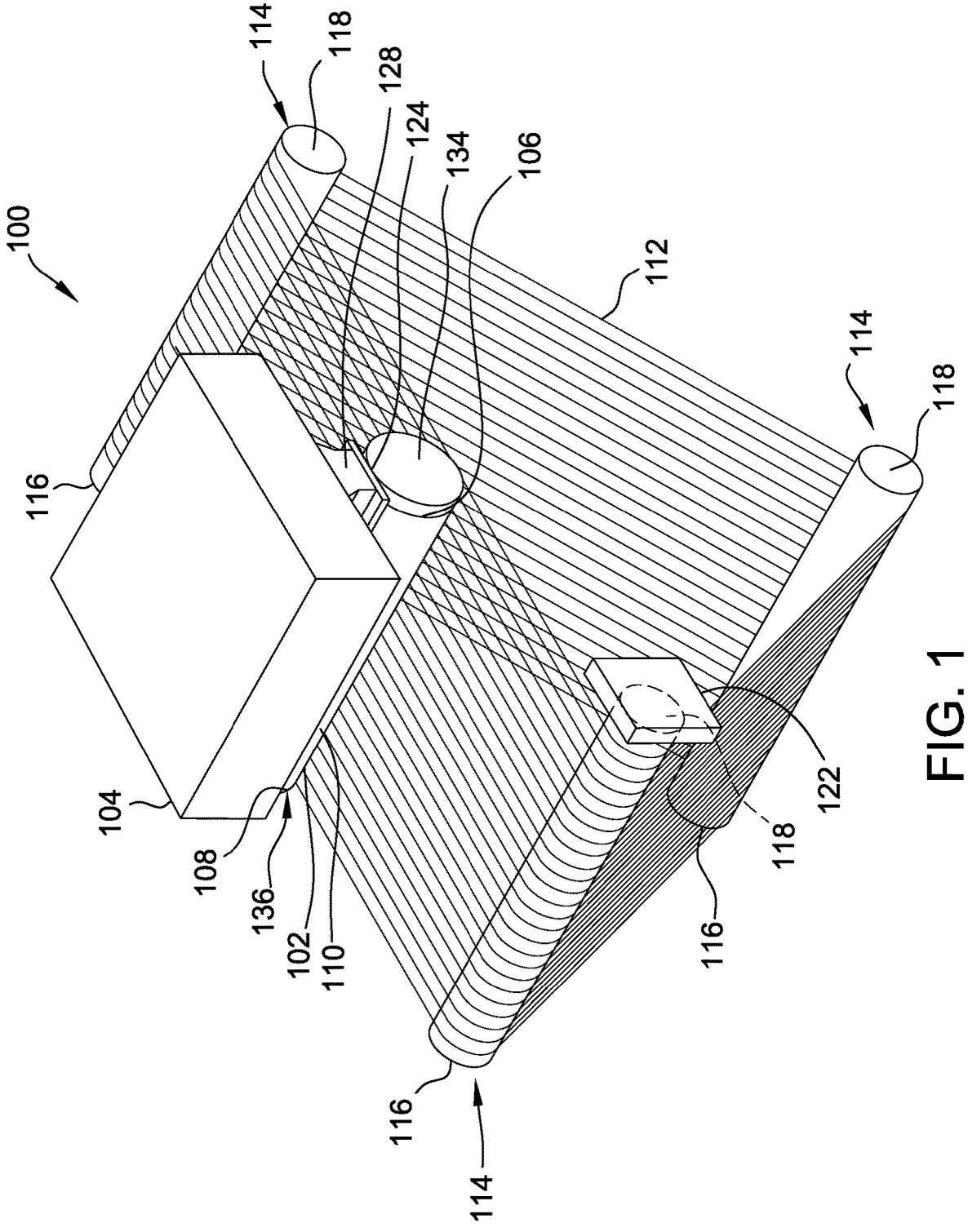
FIG. 1 is a perspective of a wafer slicing system including an ingot and a wire saw.
Figure 2:
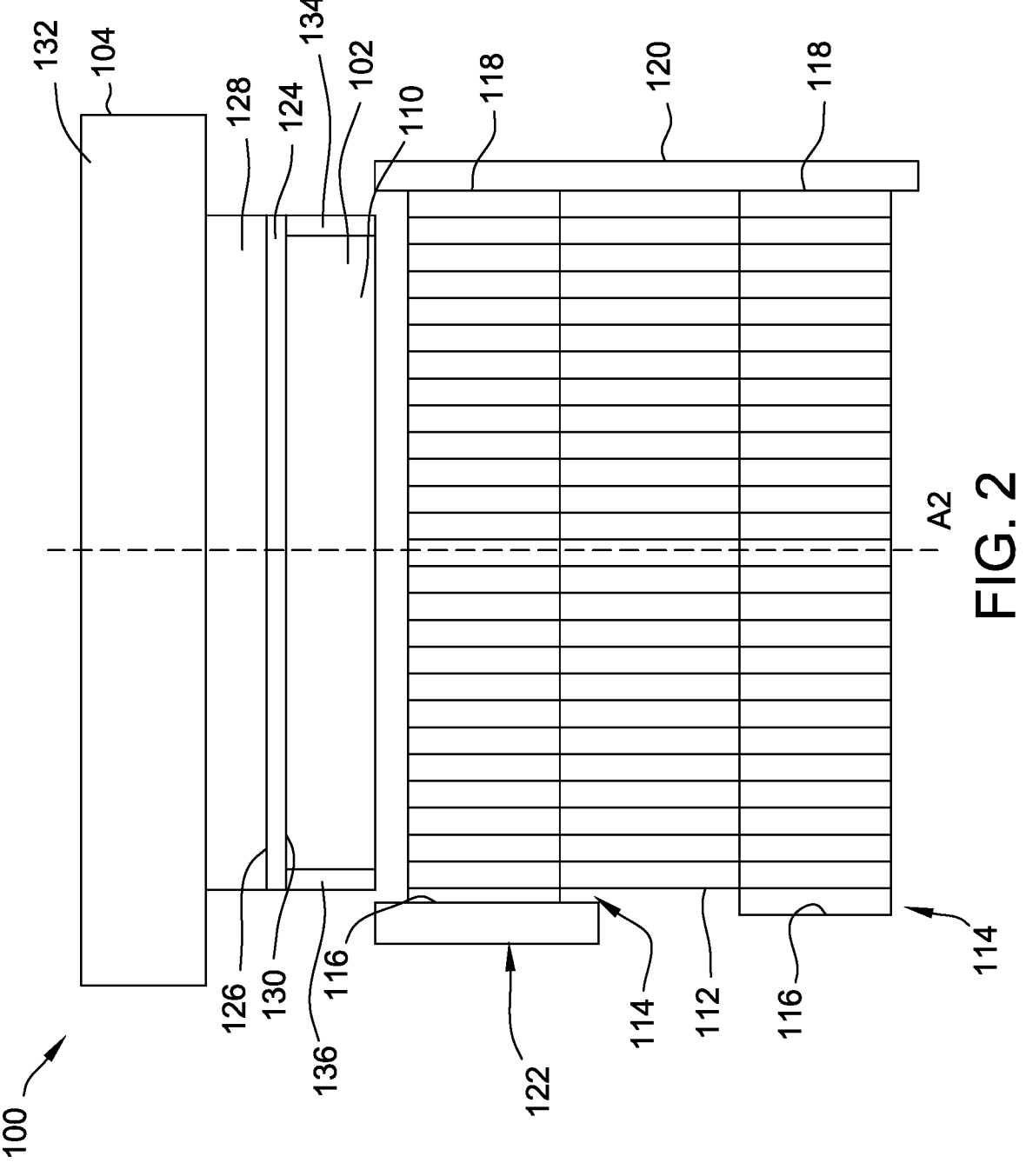
FIG. 2 is a front elevation of the ingot attached to the wire saw.

Referring now to the drawings, FIG. 1 is a schematic perspective of a wafer slicing system 100 for slicing wafers from an ingot 102, which may also be referred to as a monocrystalline semiconductor ingot or "single crystal" silicon ingot. FIG. 2 is a front view of the system 100. The system includes the ingot 102 and a wire saw 104 operable to slice the ingot 102 into monocrystalline semiconductor wafers. Various components of the wire saw 104 are omitted from the system 100 shown in FIGS. 1 and 2 for convenience of illustration and description. The wire saw 104 may include additional components, fewer components, or other components than those shown and described.

The monocrystalline semiconductor ingot 102 used in the system 100 may be made of any suitable semiconductor material. In the example system 100, the monocrystalline semiconductor ingot 102 is a monocrystalline silicon ingot. The monocrystalline semiconductor ingot 102 may be referred to herein as a monocrystalline silicon ingot 102 or a single crystal silicon ingot 102. The monocrystalline semiconductor ingot 102 is not limited to being made of single crystal silicon, and may be made from single crystal silicon, single crystal germanium, or single crystal gallium arsenide, for example. The monocrystalline semiconductor ingot 102 may be produced using any suitable technique for growing single crystal ingots. For example, the monocrystalline semiconductor ingot 102 may be grown by a batch Czochralski method, a continuous Czochralski method, or a float zone method.

Figure 3:
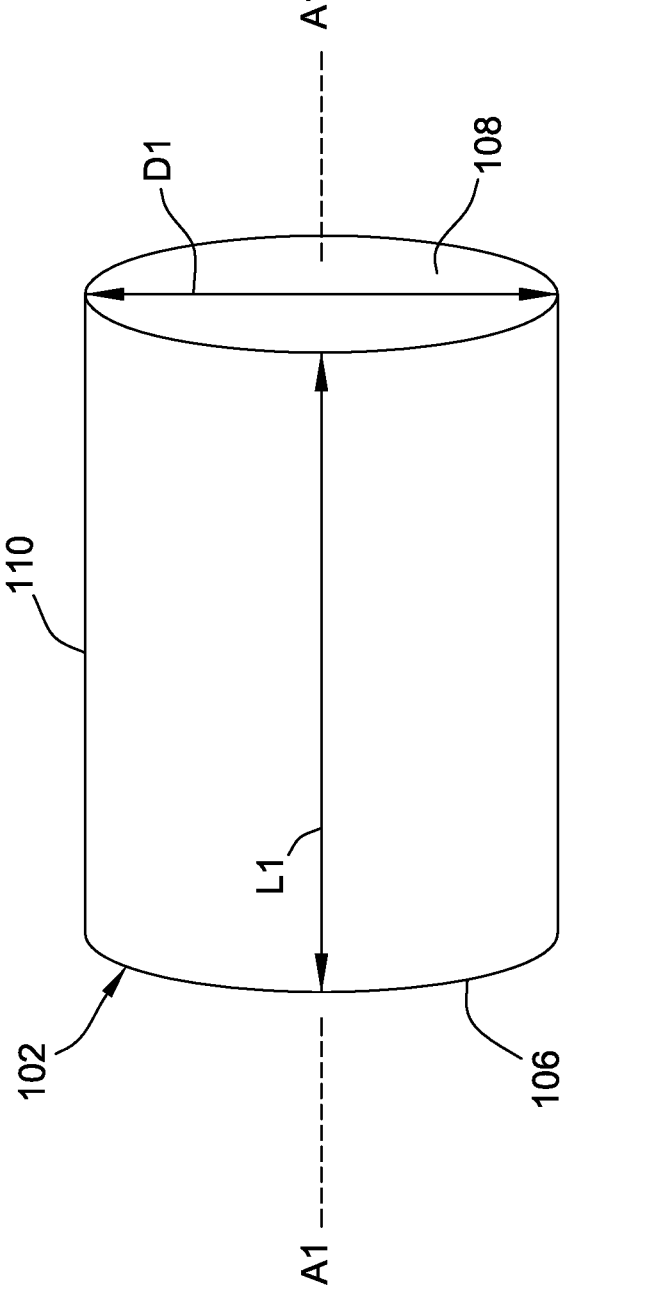
FIG. 3 is a perspective of the ingot.

With additional reference to FIG. 3, which is a schematic perspective of the monocrystalline semiconductor ingot 102 in isolation, the ingot 102 is substantially cylindrical in shape and defines a longitudinal axis $A_1$. The ingot 102 includes longitudinal end faces 106 and 108 at opposite longitudinal ends of the ingot 102. The ingot 102 also includes a circumferential edge 110 extending between the longitudinal end faces 106 and 108, substantially parallel to the longitudinal axis $A_1$. The example ingot 102 has the cylindrical shape so that wafers sliced from the ingot have a circular shape. The shape of the ingot 102 is not limited to the cylindrical shape of the illustrated example. The ingot 102 may have any suitable shape to produce a desired shape of the wafers sliced from the ingot. For example, the ingot 102 may be rectangular in shape.

The ingot 102 has an outer ingot diameter $D_1$ defined by the circumferential edge 110 and the longitudinal end faces 106 and 108. The outer ingot diameter $D_1$ may be any suitable diameter and may vary depending on a desired diameter of the wafers sliced from the ingot 102. For example, the outer ingot diameter $D_1$ may be at least (i.e., equal to or greater than) about 100 millimeters (mm), at least about 200 mm, at least about 300 mm, at least about 400 mm, or at least about 450 mm. The outer ingot diameter $D_1$ of the ingot 102 may be between about 100 mm to about 450 mm, such as between 100 mm to about 400 mm, between about 100 mm to about 300 mm, between about 100 mm to about 200 mm, between about 150 mm to about 450 mm, between about 150 mm to about 400 mm, between about 150 mm to about 300 mm, between about 150 mm to about 200 mm, between about 200 mm to about 450 mm, between about 200 mm to about 400 mm, between about 200 mm to about 300 mm, or between about 300 mm to about 450 mm.

The ingot 102 extends longitudinally a length $L_1$ between the longitudinal end faces 106 and 108. The length $L_1$ may be any suitable length and may vary depending on a desired number of wafers sliced from the ingot 102. For example, the length $L_1$ may be at least (i.e., equal to or greater than) about 25 cm, at least about 50 cm, at least about 75 cm, at least about 100 cm, at least about 150 cm, or at least about 200 cm. The length $L_1$ of the ingot 102 may be between about 25 cm to about 300 cm.

Figure 4:
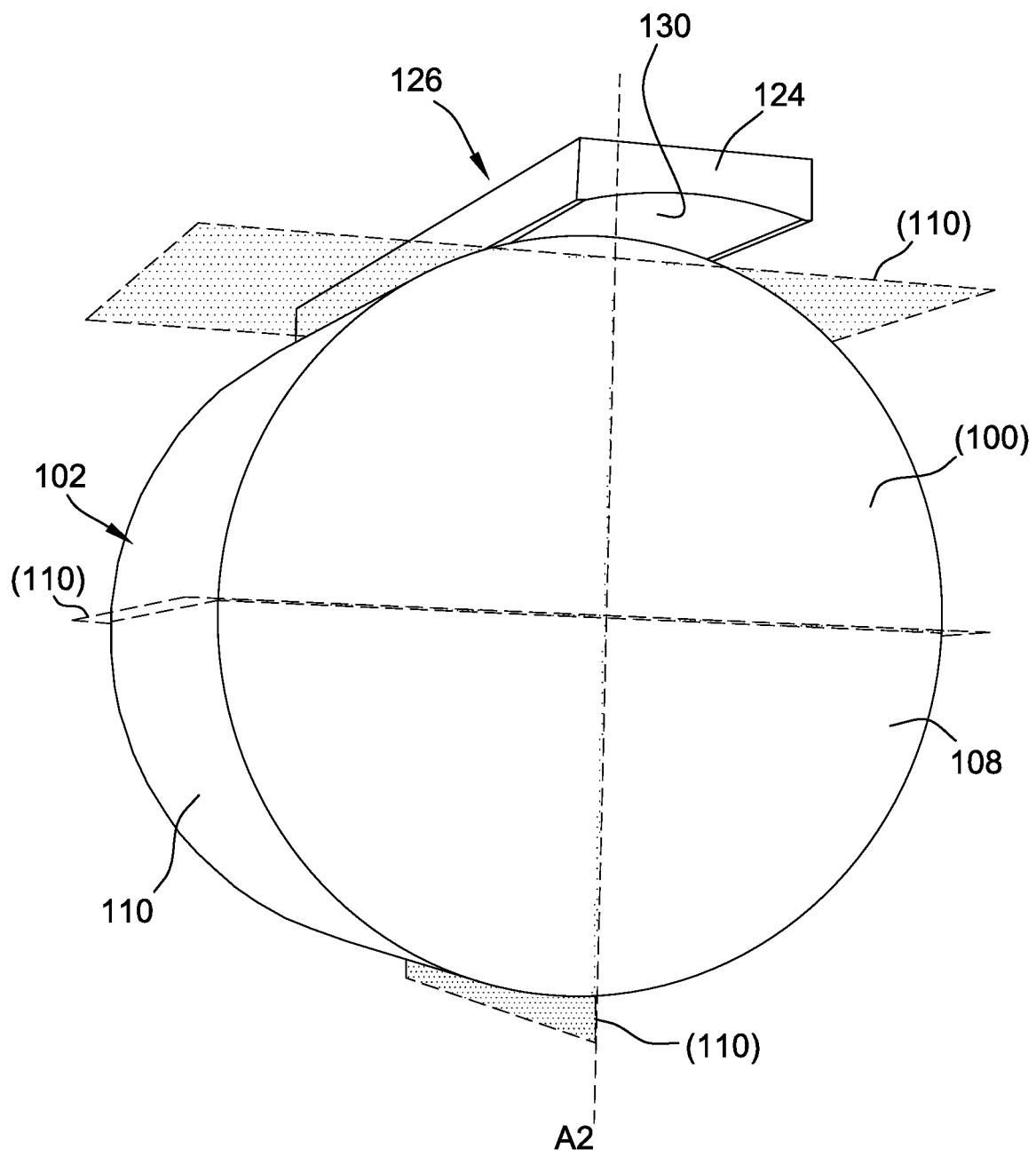
FIG. 4 is a perspective showing positions of cleavage planes of the ingot when attached to a bond beam of the system of FIGS. 1 and 2.

The ingot 102, and the wafers sliced from the ingot 102, may have any of (100), (110), or (111) crystal orientation. The example ingot 102 has a (100) crystal orientation, with a (100) crystal plane at the longitudinal end faces 106 and 108. The wafers sliced from the ingot having the (100) crystal orientation likewise have the (100) crystal orientation. A (100) crystal plane of the ingot 102 at the end face 108 is depicted in FIG. 4. The example ingot 102 having the (100) crystal orientation has mutually perpendicular (110) crystal planes (shown in FIG. 4) that intersect along the longitudinal axis $A_1$. In other examples, the crystal orientation of the ingot 102 may vary depending on the desired crystal orientation of the wafers sliced from the ingot 102, which may vary depending on the desired end use of the wafers. The ingot 102 is not limited to any crystal orientation.

The ingot 102 may be subjected to various operations to produce the cylindrical shape of the ingot 102 shown in FIG. 3, or any other desired shape of the ingot 102, prior to a slicing operation performed using the wire saw 104. For example, single crystal silicon ingots grown by the Czochralski method typically include a seed cone and a tail cone at opposite longitudinal ends of the ingot, as well as a generally cylindrical main body portion between the seed cone and the end cone. The seed end and the tail cone are removed from the ingot (e.g., by cropping, lapping, and/or grinding operations), and the main body portion that remains forms the ingot 102 (or multiple ingots 102) having the desired shape. The ingot 102 may also be trimmed to form an orientation flat or a notch (not shown) in the circumferential edge 110 and/or longitudinal end face(s) 106 and/or 108, which is used to determine the crystal orientation of the ingot 102. The ingot 102 may also be subjected to grinding (e.g., via a grindwheel) to produce the desired outer ingot diameter $D_1$ and/or the desired length $L_1$ of the ingot 102.

Grinding may occur on the entire single crystal silicon ingot, e.g., before cropping, lapping, and/or trimming operations. Other grinding wheels or suitable tools may be used to carve the notch or flat to define the proper orientation of the future wafer versus a particular crystallographic axis.

Referring again to FIGS. 1 and 2, the wire saw 104 includes a continuous wire web 112 (also referred to as wires 112). The wires 112 are used to slice (i.e., cut or saw) the ingot 102 into wafers. In this example, the wire web 112 includes multiple wires. In other examples, the wire web 112 may include a single continuous wire that forms the web. The wires 112 may be of any suitable type for slicing the ingot 102, such as diamond wires, for example. The number of wires 112 included in the wire saw 104 is greatly reduced in FIGS. 1 and 2 for convenience of illustration and description. The spacing between adjacent wires 112 is also exaggerated in FIGS. 1 and 2. The number of wires 112 and the spacing between adjacent wires 112 in the wire saw 104 may be selected to slice the ingot 102 into wafers having a desired thickness. For example, wafers sliced from the ingot 102 using the wire saw 104 may have a thickness of at least (i.e., equal to or greater than) about 200 micrometers ($\mu$m), at least about 300 $\mu$m, at least about 400 $\mu$m, at least about 500 $\mu$m, at least about 600 $\mu$m, at least about 700 $\mu$m, at least about 800 $\mu$m, at least about 900 $\mu$m, or at least about 1000 $\mu$m. The wafers sliced from the ingot 102 using the wire saw 104 may have a thickness of between about 250 $\mu$m to about 1500 $\mu$m, such as between about 300 $\mu$m to about 1000 $\mu$m, or between 500 $\mu$m to about 1000 $\mu$m. The wafers sliced from the ingot 102 may have the same desired thickness (in which case the spacing between adjacent wires 112 is the same throughout the web), or the wafers sliced from the ingot 102 may have different desired thicknesses (in which case the spacing between adjacent wires 112 may vary).

The wires 112 are supported by wire guides 114. The wires 112 extend substantially parallel between each pair of adjacent wire guides 114. In the example wire saw 104, three wire guides 114 are included and arranged in an inverted triangle formation. Any suitable number of wire guides 114 may be included in any suitable arrangement. For example, the wire saw 104 may include four wire guides 114 which may be arranged in a square or rectangular formation.

Each wire guide 114 has opposing ends 116, 118 that are connected to a frame 120 (only a portion of which is shown in FIG. 2) of the wire saw 104 by a bearing 122. The bearings 122 may be any suitable type of bearing, such as ball bearings, roller bearings, and the like. A cooling fluid may be in thermal communication with the bearings 122 supporting each wire guide 114 such that the fluid is contact with at least a portion of the bearing or a structure that is in turn in contact with the bearing. The cooling fluid is circulated in contact with the bearings 122 to control their temperature (e.g., to cool the bearings during operation of the wire saw 104).

One or more of the wire guides 114 may be connected to a drive source (not shown), such as a motor, to rotate the guides. The wire guides 114 rotate to drive the wire web 112, which travels a circuitous path around the wire guides 114 when slicing the ingot 102. Each of the wire guides 114 may be drive guides that are actively rotated by a drive source. Alternatively, one or more of the wire guides 114 may be a drive guide while one or more of the wire guides 114 may be a follower guide that is rotated by movement of the wires 112 driven by the drive guide(s). The wire guides 114 may rotate in a single direction during the slicing operation, or may reverse in rotation to change a direction that the wires 112 travel around the wire guides 114 during the slicing operation.

Figure 6:
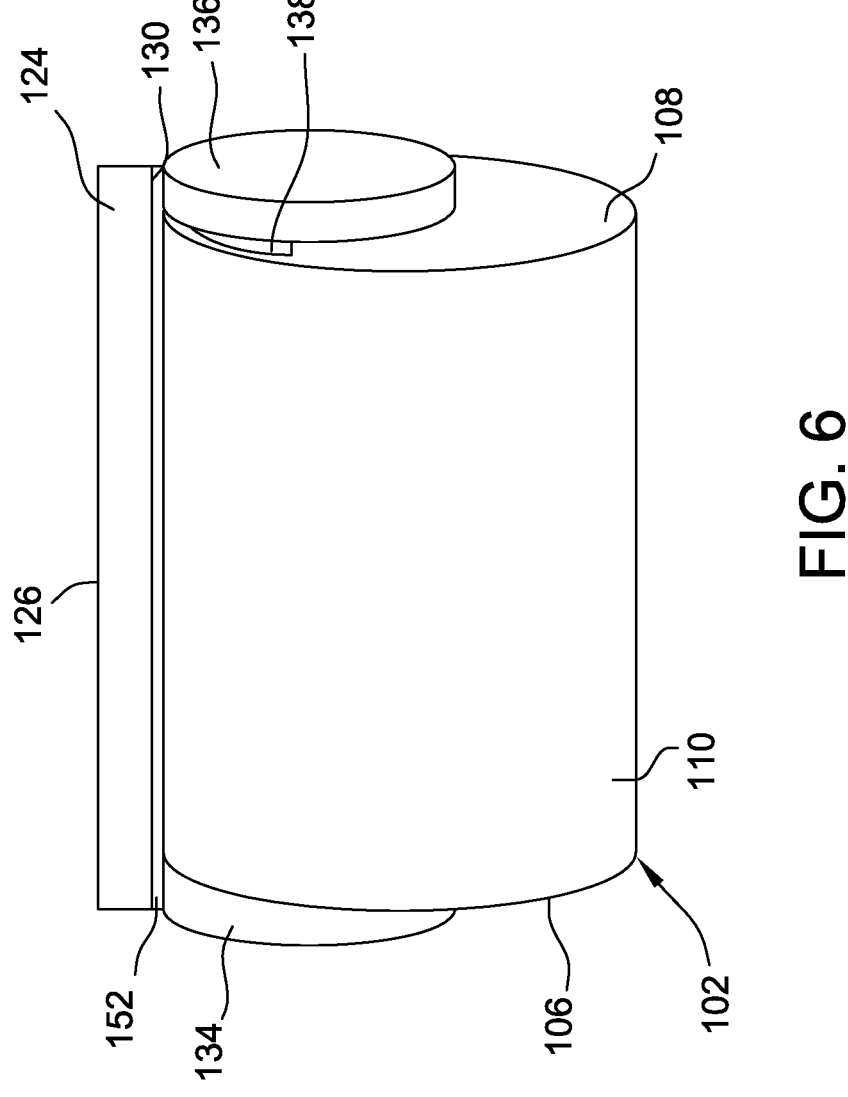
FIG. 6 is a perspective of the ingot attached to the bond beam and the sacrificial disks positioned adjacent longitudinal end faces of the ingot.

The system 100 also includes a bond beam 124 that facilitates connecting the ingot 102 to the wire saw 104. The bond beam 124 has a first surface 126 that is attached to an ingot holder 128 and a second surface 130 that is attached to circumferential edge 110 of the ingot 102. The surfaces 126 and 130 of the bond beam 124 may be respectively attached to the ingot holder 128 and the ingot 102 with an adhesive (e.g., glue). An adhesive layer 152 used to adhere the ingot 102 to the second surface 130 of the bond beam 124 is shown in FIG. 6. The second surface 130 of the bond beam 124 may have a suitable contour for adhering to the ingot 102 with adhesive and creating a sufficient adhesive bond therebetween. For example, the second surface 130 may have a concave contour extending the length of the beam 124 to complement the circumferential edge 110 of the ingot 102. The first surface 126 of the bond beam 124 may be substantially flat to complement a lower surface of the ingot holder 128 to which the first surface is attached.

During slicing, the wires 112 of the saw 104 may contact the bond beam 124 after slicing the ingot 102 into wafers in order to ensure that the ingot has been completely sliced into wafers. The bond beam 124 may be formed from a material that is easily sawn or sliced by the wire saw 104 during slicing of the ingot 102 into wafers without damaging the wires 112 of the saw. Examples of such materials include epoxy, glass, and other resins.

The ingot holder 128, and the bond beam 124 attached to the ingot holder, are in turn connected to a structure 132 of the wire saw 104 using any suitable means. For example, the ingot holder 128 may be connected to the structure 132 by a clamping rail (not shown) received by the ingot holder that enables the ingot holder to slide into and out of the structure 132 along the rail. Accordingly, the other components of the system 100 connected to the ingot holder 128 (e.g., the bond beam 124 and the ingot 102) are also able to be slid into and out of the structure 132. In other embodiments any suitable fastening system (e.g., mechanical fasteners) can be used to connect the ingot holder 128 to the structure 132.

The wire saw 104 is operable to move the structure 132 along a movement axis $A_2$ relative to the wire web 112. Movement of the structure 132 may be facilitated by any suitable means, such as linear actuators, motors, hydraulic cylinders, pneumatic cylinders, and the like. Movement of the structure 132 along the axis $A_2$ enables the bond beam 124 and the ingot 102 to be moved toward the wire web 112 for slicing the ingot 102 into wafers. In the example system 100, the structure 132 is moved downward along the axis $A_2$ during the slicing operation. In other examples, the structure 132 may be moved in any direction toward the wires 112, and the relative positioning of the wire web 112, the structure 132, and the movement axis $A_2$ is not limited to the illustrated example. For example, in some embodiments, the structure 132 may move upward along the movement axis $A_2$ during a slicing operation to move the bond beam 124 and the ingot 102 towards the wires 112.

The system 100 may also include one or more slurry sprayers (not shown) that are operable to supply a slurry onto the ingot 102 and/or the wires 112 during a slicing operation. The slurry may be a liquid formulation that includes abrasive particles or a liquid that does not include abrasive particles (e.g., water). The slurry may enable the wires 112 to work against the single crystal semiconductor material of the ingot 102 to enable the wafers to be sliced from the ingot. Additionally and/or alternatively, the slurry may be used to control a temperature of ingot 102 during the slicing operation. When slicing single crystal ingots, the friction between the ingot 102 and the wires 112 generates heat, which increases the temperature of the ingot. Heat may be dissipated by spraying the ingot 102 and wire web 112 with the slurry.

In operation of the wire saw 104, the ingot 102 is attached to the bond beam 124 along its circumferential edge 110, and the bond beam 124 is in turn attached to the ingot holder 128. The ingot holder 128 is connected to the moveable structure 132 of the wire saw 104. The ingot 102 "hangs" from the structure 132, and the wire saw 104 is operated to move the structure 132 and the hanging ingot 102 towards the wire web 112. At this stage, the wire web 112 is driven by the wire guides 114 to travel around the guides for slicing the ingot 102. The structure 132 is moved along the movement axis $A_2$, bringing the circumferential edge 110 of the ingot 102 into contact with the wires 112. The wires 112 work against the circumferential edge 110 of the ingot 102 as the ingot continues to be moved along the axis $A_2$, until wafers are sliced from the ingot 102. Slurry may be sprayed onto the ingot 102 and/or the wires 112 as the wires work against the ingot. The wires 112 may at least partially cut into the bond beam 124 to ensure complete separation of the wafers.

During the slicing operation, wafers being sliced from proximate the longitudinal end faces 106 and 108 of the ingot 102 ("longitudinal end wafers") may break along relatively weak planes or cleavage planes due to stresses exerted by the wires 112. Referring to FIG. 4, an example crystal orientation of the ingot 102 is shown to illustrate this effect. The crystal orientation of the ingot 102 is shown in FIG. 4 relative to the position of the ingot 102 when attached on the bond beam 124 and installed on the moveable structure 132. The example ingot 102 has a (100) crystal orientation, with a (100) crystal plane at the longitudinal end faces 106 and 108. A (100) crystal plane is indicated at the longitudinal end face 108 in FIG. 4. The ingot 102 has mutually perpendicular (110) crystal planes that intersect along the longitudinal axis $A_1$. The (110) crystal planes are relatively weak cleavage planes along which the wafers sliced from the ingot 102 may break if enough stress is exerted along these planes. The ingot 102 may be positioned such that one of the (110) crystal planes extends substantially perpendicular to the movement axis $A_2$ and substantially parallel to the wires 112, and the other of the (110) crystal planes extends substantially parallel to the movement axis and substantially perpendicular to the wires.

As the wires 112 work through the ingot 102 along the movement axis $A_2$, the area of the (110) crystal planes reduces. The stresses exerted by the wires 112 concentrate along the reduced (110) crystal planes, and the longitudinal end wafers may break (e.g., fracture) along these cleavage planes. The wafers sliced from the ingot 102 inboard of the longitudinal ends, proximate the center bulk region of the ingot ("center wafers"), are supported on both longitudinal sides by the mass of the wafers being sliced from the ingot towards the longitudinal ends. The longitudinal support provided to the center wafers may compensate and/or offset the stresses and prevent the stresses from concentrating along the cleavage planes, thereby reducing the propensity of the center wafers to break during the slicing operation. However, the longitudinal end wafers sliced from the ingot 102 lack this longitudinal support and therefore are more susceptible to break during the slicing operation. This negative result may occur at any crystal orientation of the ingot 102 and/or any stage of the slicing operation, but the longitudinal end wafers may be particularly susceptible to break during the slicing operation when the cleavage planes are positioned as shown in FIG. 4.

Referring again to FIGS. 1 and 2, the system 100 includes sacrificial disks 134 and 136 that provide longitudinal support to and inhibit uncontrolled breakage of the wafers sliced from the ingot 102 proximate the longitudinal end faces 106 and 108, or longitudinal end wafers. One of the sacrificial disks 134 and 136 is positioned adjacent each of the longitudinal end faces 106 and 108 of the ingot 102 when the ingot is attached to the bond beam 124. The sacrificial disk 134 is positioned adjacent the longitudinal end face 106 and the sacrificial disk 136 is positioned adjacent the longitudinal end face 108. In the example system 100, two sacrificial disks 134 and 136 are included. Any suitable number of sacrificial disks may be included to enable the disks to function as described. For example, multiple sacrificial disks 134 may be stacked longitudinally from the longitudinal end face 106 and/or multiple sacrificial disks 136 may be stacked longitudinally from the longitudinal end face 106.

The sacrificial disks 134 and 136 may be made of any suitable material, including for example semiconductor material such as silicon. For example, each sacrificial disk 134, 136 may be made of monocrystalline semiconductor material, such as single crystal silicon. Use of monocrystalline semiconductor material in the disks 134, 136 may be cost effective and provide the disks with sufficient rigidity to support the longitudinal end faces 106 and 108 of the ingot 102 during wafer slicing. Other semiconductor materials may include for example, sintered or amorphous semiconductor material (e.g., sintered or amorphous silicon). Monocrystalline semiconductor material may provide more rigidity to the disks 134 and 136 than other semiconductor material and enable the disks 134 and 136 to provide better support to the longitudinal end wafers during the slicing operation. The monocrystalline semiconductor material forming the disks 134 and 136 may be similar to, or dissimilar from, the monocrystalline semiconductor material of the ingot 102.

In the example system 100, the ingot 102 and the disks 134, 136 are suitably made of single crystal silicon or monocrystalline silicon. The use of similar monocrystalline semiconductor material (e.g., monocrystalline silicon) for the disks 134, 136 and the ingot 102 may facilitate reducing impurities that may be introduced into the longitudinal end wafers of the ingot 102 by the adjacent disks 134, 136. Moreover, monocrystalline semiconductor material (e.g., single crystal silicon) is suitably compatible with a slurry used during the slicing operation and may enable the slurry to be recycled for subsequent slicing operations where recycling is desired.

Figure 5:
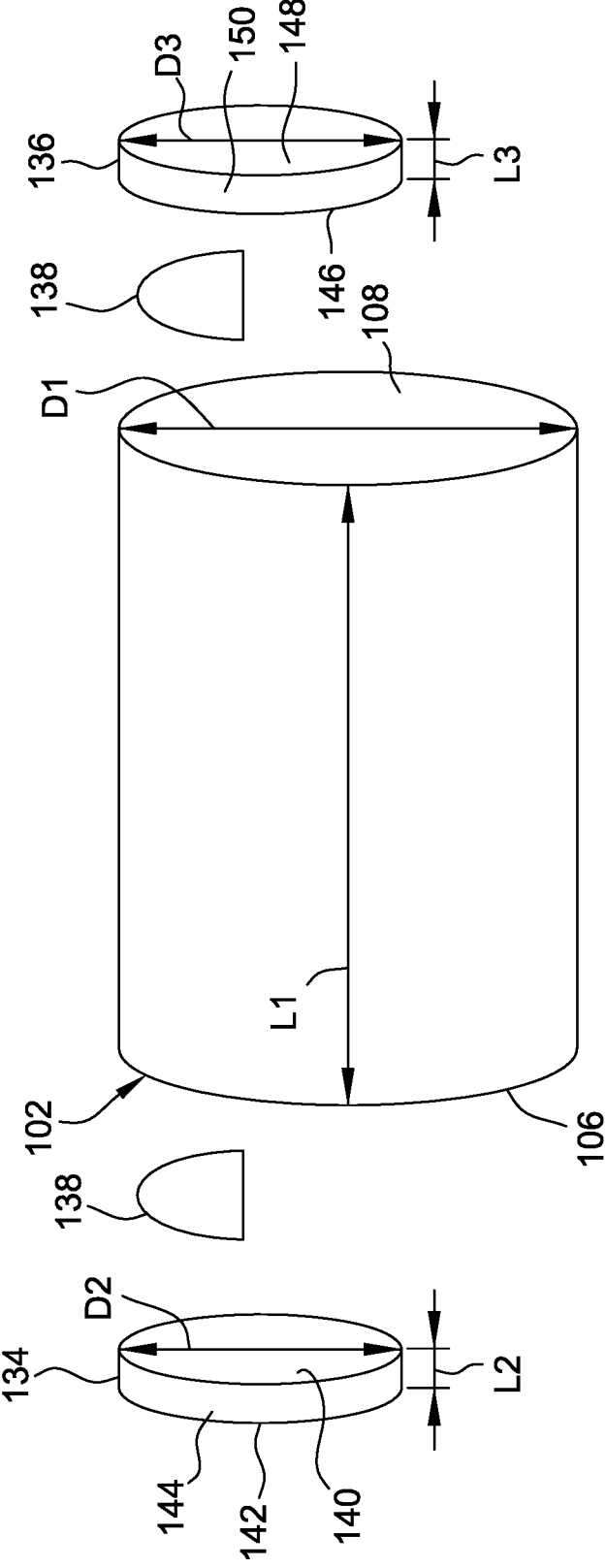
FIG. 5 is an exploded view showing the ingot and sacrificial disks that inhibit uncontrolled wafer breakage during a slicing operation.

FIGS. 5 and 6 show the ingot 102 and the sacrificial disks 134 and 136 in greater detail. FIG. 5 is an exploded view of the ingot 102, the sacrificial disks 134 and 136 at the opposite longitudinal ends of the ingot, and adhesive layers 138 that may be used to adhere the disks 134 and 136 to the longitudinal end faces 106 and 108, respectively. FIG. 6 shows the ingot 102 attached to the bond beam 124 with the sacrificial disks 134 and 136 positioned adjacent the longitudinal end faces 106 and 108, respectively.

The example sacrificial disk 134 includes two major faces 140 and 142 and a circumferential edge 144 extending between the faces 140 and 142. A first major face 140 of the sacrificial disk 134 is positioned adjacent the longitudinal end face 106 of the ingot 102, and a second major face 142 faces away from the ingot 102. Suitably, when the sacrificial disk 134 is positioned adjacent the longitudinal end face 106 of the ingot 102, the first major face 140 is in face-to-face contact with the longitudinal end face 106 such that little to no spacing exists therebetween. The sacrificial disk 134 has an outer disk diameter $D_2$ that is defined by the faces 140 and 142 and the circumferential edge 144. The sacrificial disk 134 also has a thickness $L_2$ measured as the distance that the circumferential edge 144 extends between the faces 140 and 142.

Similarly, the example sacrificial disk 136 includes two major faces 146 and 148 and a circumferential edge 150 extending between the faces 146 and 148. A first major face 146 of the sacrificial disk 136 is positioned adjacent the longitudinal end face 108 of the ingot 102, and a second major face 148 faces away from the ingot 102. Suitably, when the sacrificial disk 136 is positioned adjacent the longitudinal end face 108 of the ingot 102, the first major face 146 is in face-to-face contact with the longitudinal end face 108 such that little to no spacing exists therebetween. The sacrificial disk 136 has an outer disk diameter $D_3$ that is defined by the faces 140 and 142 and the circumferential edge 144. The sacrificial disk 136 also has a thickness $L_3$ measured as the distance that the circumferential edge 150 extends between the faces 146 and 148.

The shape of the sacrificial disks 134 and 136 may vary depending on a shape of the ingot 102. The disks 134 and 136 are suitably circular in the example system 100 to complement the circular shape of longitudinal end faces 106 and 108 of the cylindrical ingot 102. In other examples, the disks 134 and 136 may have other shapes to complement the shape of the ingot 102. For example, the disks 134 and 136 may be rectangular or square shaped.

The sacrificial disks 134 and 136 may be attached to the respectively adjacent longitudinal end faces 106 and 108 of the ingot 102. In the example system 100, the first major face 140 of sacrificial disk 134 is adhered to the longitudinal end face 106 with an adhesive layer 138 and the first major face 146 of the sacrificial disk 136 is adhered to the longitudinal end face 108 with an adhesive layer 138. The adhesive layers 138 may include any suitable adhesive material for adhering materials together, such as glue for example. To facilitate reducing the propensity of adhesive failure due to the heat generated during the slicing operation by the friction between the ingot 102 and the wires 112, the adhesive layers 138 may suitably include heat-resistant glue that can withstand temperatures of 80° C. or greater.

Any suitable method may be used to attach the disks 134 and 136 respectively to the longitudinal end faces 106 and 108. For example, the disks 134 and 136 may be thermally bonded, adhesively bonded, pressure bonded, or any combination thereof, to the longitudinal end faces 106 and 108. In some examples, the disks 134 and 136 may be attached to the longitudinal end faces 106 and 108 without any significant additional processing (e.g., with heating, adhering, pressure bonding, and the like). For example, where the disks 134 and 136 and the ingot 102 are each made of single crystal silicon, the disks 134 and 136 may be positioned adjacent the respective longitudinal end faces 106 and 108 of the ingot and are held thereto by attractive forces (e.g., Van der Waals bonds) that exist between silicon atoms at the major surfaces of the disks and longitudinal end faces of the ingot.

Sacrificial disks 134 and 136 may additionally and/or alternatively be attached to the second surface 130 of the bond beam 124 adjacent the respective longitudinal end faces 106 and 108 of the ingot 102 (e.g., with an adhesive). For example, as shown in FIG. 6, an adhesive layer 152 (e.g., glue) that is used to adhere the circumferential edge

110 of the ingot 102 to the second surface 130 of the bond beam 124 may also be used to adhere the circumferential edges 144 and 150 of the disks 134 and 136, respectively, to the second surface 130 of the bond beam 124. Alternatively, separate adhesive layers may be used for attaching the disks 134 and 136 to the bond beam 124.

Figure 8:
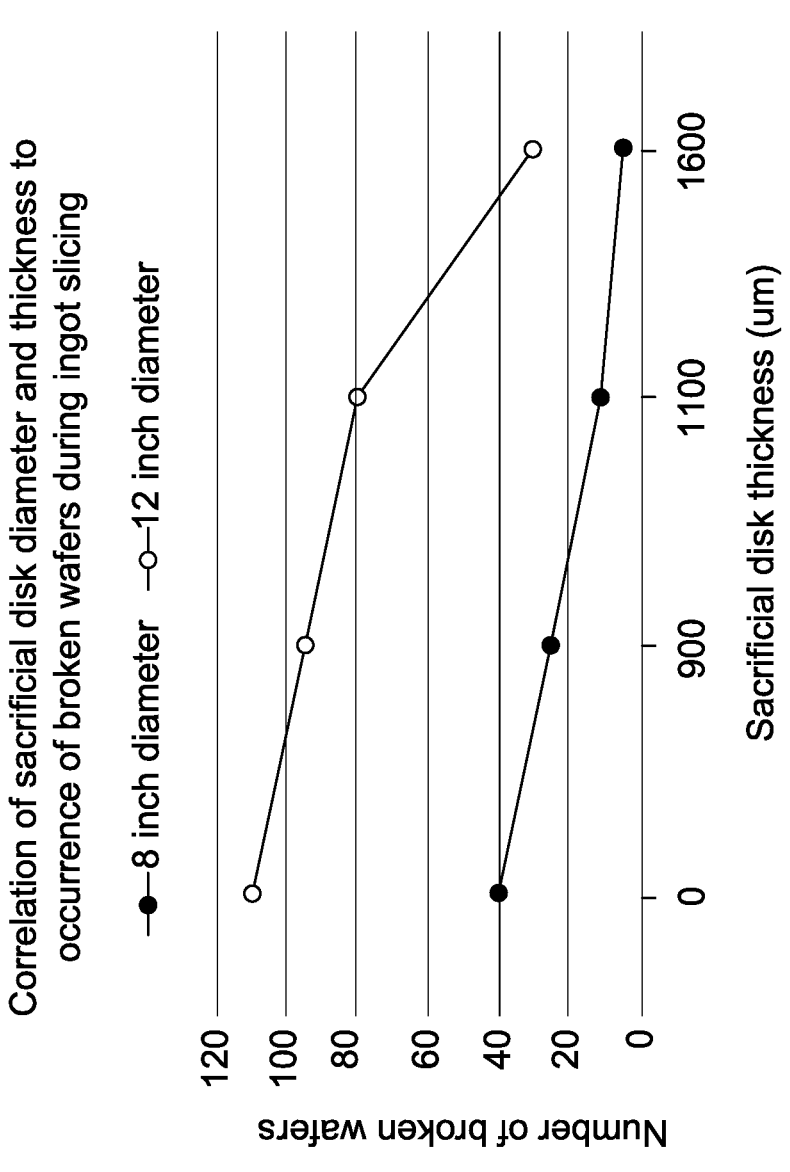
FIG. 8 is a graph showing correlation between the diameter and thickness of the sacrificial disks and the number of wafers that prematurely break during a slicing operation.

In the example system 100, the outer disk diameters $D_2$ and $D_3$ are each smaller than the outer ingot diameter $D_1$. The smaller outer disk diameters $D_2$ and $D_3$ may provide several advantages. For example, smaller diameter disks 134 and 136 may further reduce wafer breakage as compared to larger diameter disks 134 and 136. Referring to FIG. 8, a correlation between the diameter of the sacrificial disks 134 and 136 and the number of wafers that broke during experimental ingot slicing operations is shown. As shown in FIG. 8, the use of 8-inch diameter (or about 200 mm diameter) sacrificial disks 134 and 136 resulted in a smaller number of broken wafers than the number of wafers that broke when using 12-inch (or about 300 mm diameter) sacrificial disks 134 and 136. Thus, the use of smaller diameter disks 134 and 136 may facilitate reducing the number of longitudinal end wafers that break during slicing.

Using smaller diameter disks 134 and 136 also reduces material losses that are incurred by using the sacrificial disks during a slicing operation. Additionally, the smaller outer disk diameters $D_2$ and $D_3$ may provide greater rigidity to the sacrificial disks 134 and 136. For example, monocrystalline semiconductor disks 134 and 136 may have greater rigidity at smaller diameters, and are inherently less likely to break during the slicing operation and/or when positioned adjacent the respective longitudinal end faces 106 and 108 of the ingot. In this regard, the use of the smaller diameter disks 134 and 136 may enable repeated use of the sacrificial disks between multiple slicing operations. Furthermore, the use of smaller diameter disks 134 and 136 may enable easier inspection to ensure that the disks 134 and 136 are properly positioned adjacent the respective longitudinal end faces 106 and 108 and that the disks 134 and 136 are appropriately aligned (e.g., have a desired crystal plane positioning). In other examples, one or both of the outer disk diameters $D_2$ and $D_3$ may be the same as the outer ingot diameter $D_1$.

The outer disk diameters $D_2$ and $D_3$ may be any suitable diameter to enable the disks 134 and 136 to function as described. For example, the outer disk diameters $D_2$ and $D_3$ may be at least (i.e., equal to or greater than) about 100 mm, at least about 200 mm, at least about 300 mm, at least about 400 mm, or at least about 450 mm. The outer disk diameters $D_2$ and $D_3$ may be between about 100 mm to about 450 mm, such as between 100 mm to about 400 mm, between about 100 mm to about 300 mm, between about 100 mm to about 200 mm, between about 150 mm to about 450 mm, between about 150 mm to about 400 mm, between about 150 mm to about 300 mm, between about 150 mm to about 200 mm, between about 200 mm to about 450 mm, between about 200 mm to about 400 mm, between about 200 mm to about 300 mm, or between about 300 mm to about 450 mm. The outer disk diameters $D_2$ and $D_3$ may be selected from these ranges with the proviso that one or both of the outer disk diameters $D_2$ and $D_3$ is smaller than the outer ingot diameter $D_1$. In some examples, the outer disk diameters $D_2$ and $D_3$ are each between about 150 mm to about 300 mm, such as about 150 mm, about 200 mm, about 250 mm, or about 300 mm, and the outer ingot diameter $D_1$ is greater than each of the outer disk diameters $D_2$ and $D_3$, for example, between about 300 mm to about 450 mm, such as about 300 mm, about 400 mm, or about 450 mm. The outer disk diameters $D_2$ and $D_3$ may be the same diameter or different diameters.

In examples where the sacrificial disks 134 and 136 have smaller outer diameters $D_2$ and $D_3$ than the outer ingot diameter $D_1$, the sacrificial disks 134 and 136 may be axially offset from the longitudinal axis $A_1$ (FIG. 3) when positioned adjacent the longitudinal end faces 106 and 108. Suitably, the smaller diameter disks 134 and 136 are axially offset from the axis $A_1$ and located adjacent the bond beam 124 (as shown in FIG. 5). At this position, the smaller diameter disks 134 and 136 provide longitudinal support to the longitudinal end wafers along the regions of the ingot 102 where these wafers are most susceptible to break during the slicing operation. Referring back to FIG. 4, as described above, the area of the (110) crystal planes reduces as the wires 112 progressively slice through the ingot 102 towards the bond beam 124, and the longitudinal end wafers may be particularly susceptible to break as the wires 112 approach the bond beam. The smaller diameter disks 134 and 136 may suitably be located adjacent the bond beam 124 to provide longitudinal support to the longitudinal end wafers at this stage. The disks 134 and 136 may have the relatively smaller outer diameters $D_2$ and $D_3$ and still inhibit uncontrolled breakage of the wafers as wafer breakage during the earlier stages of the slicing operation, when the wires 112 start to work through the ingot 102, is less likely to occur.

The thicknesses $L_2$ and $L_3$ of the sacrificial disks 134 and 136 may be any suitable thickness to enable the disks to function as described. For example, the thicknesses $L_2$ and $L_3$ may be at least (i.e., equal to or greater than) about 300 µm, at least about 400 µm, at least about 500 µm, at least about 600 µm, at least about 700 µm, at least about 800 µm, at least about 900 µm, or at least about 1000 µm. The thicknesses $L_2$ and $L_3$ may be between about 100 µm to about 5000 µm, such as between about 500 µm to about 5000 µm, between about 500 µm to about 4000 µm, between about 500 µm to about 3000 µm, between about 500 µm to about 2000 µm, between about 500 µm to about 1600 µm, between about 500 µm to about 1000 µm, between about 1000 µm to about 5000 µm, between about 1000 µm to about 4000 µm, between about 1000 µm to about 3000 µm, between about 1000 µm to about 2000 µm, between about 1000 µm to about 1600 µm, between about 1400 µm to about 2000 µm, between about 1400 µm to about 1800 µm, or between about 1500 µm to about 1700 µm. In various examples, the thicknesses $L_2$ and $L_3$ are each between about 800 µm to about 1600 µm, such as between about 800 µm to about 1000 µm. In some examples, the thicknesses $L_2$ and $L_3$ are each about 800 µm, about 850 µm, about 900 µm, about 950 µm, or about 1000 µm. The thicknesses $L_2$ and $L_3$ of the sacrificial disks 134 and 136 may be the same thickness or different thicknesses. The thicknesses $L_2$ and $L_3$ of the sacrificial disks 134 and 136 may be for single disks or the thicknesses may be built, for example, by longitudinally stacking multiple disks 134 and/or multiple disks 136.

Using relatively greater thicknesses $L_2$ and $L_3$, for example, thicknesses of at least about 500 µm, or at least about 800 µm, such as between about 500 µm to about 2000 µm, or between about 800 µm to about 1600 µm, may further reduce wafer breakage as compared to sacrificial disks with smaller thicknesses. Referring again to FIG. 8, a correlation between the thickness of the sacrificial disks 134 and 136 and the number of wafers that broke during experimental ingot slicing operations is shown. As shown in FIG. 8, for both 8-inch diameter (or about 200 mm diameter) sacrificial disks 134 and 136 and 12-inch (or about 300 mm diameter) diameter sacrificial disks, the number of wafers that broke during slicing decreased as the thickness of the disks increased. Thus, the use of thicker diameter disks 134 and

136 may facilitate reducing the number of longitudinal end wafers that break during slicing.

As described above, the sacrificial disks 134 and 136 may be made of the same monocrystalline semiconductor material that the ingot 102 and the wafers sliced from the ingot are made of. The ingot 102 and the disks 134 and 136 are each made of single crystal silicon in the example system 100. The disks 134 and 136 may also have the same crystal orientation as the ingot 102 and the wafers. For example, the sacrificial disks 134 and 136, the ingot 102, and the wafers sliced from the ingot 102, may have any of (100), (110), or (111) crystal orientation. In the example system 100, the ingot 102, the wafers sliced from the ingot, and the sacrificial disks 134 and 136 have a (100) crystal orientation. In other examples, the sacrificial disks 134 and 136 may have a different crystal orientation from the ingot 102 and the wafers sliced from the ingot.

The sacrificial disks 134 and 136 that have the (100) crystal orientation also have cleavage (110) crystal planes. In some examples, the sacrificial disks 134 and 136 may be positioned with their cleavage planes offset from the cleavage planes of the ingot 102. As described above with reference to FIG. 4, the cleavage planes of the ingot 102 may be respectively positioned perpendicular and parallel to the movement axis $A_2$. The cleavage planes of the sacrificial disks 134 and 136 may be positioned at an oblique angle to the cleavage planes of the ingot 102 and the movement axis $A_2$. This may provide a more beneficial orientation of the sacrificial disks 134 and 136 during the slicing operation and facilitate reducing the propensity of the disks to break and fall off the ingot 102 and/or the bond beam 124.

Figure 7:
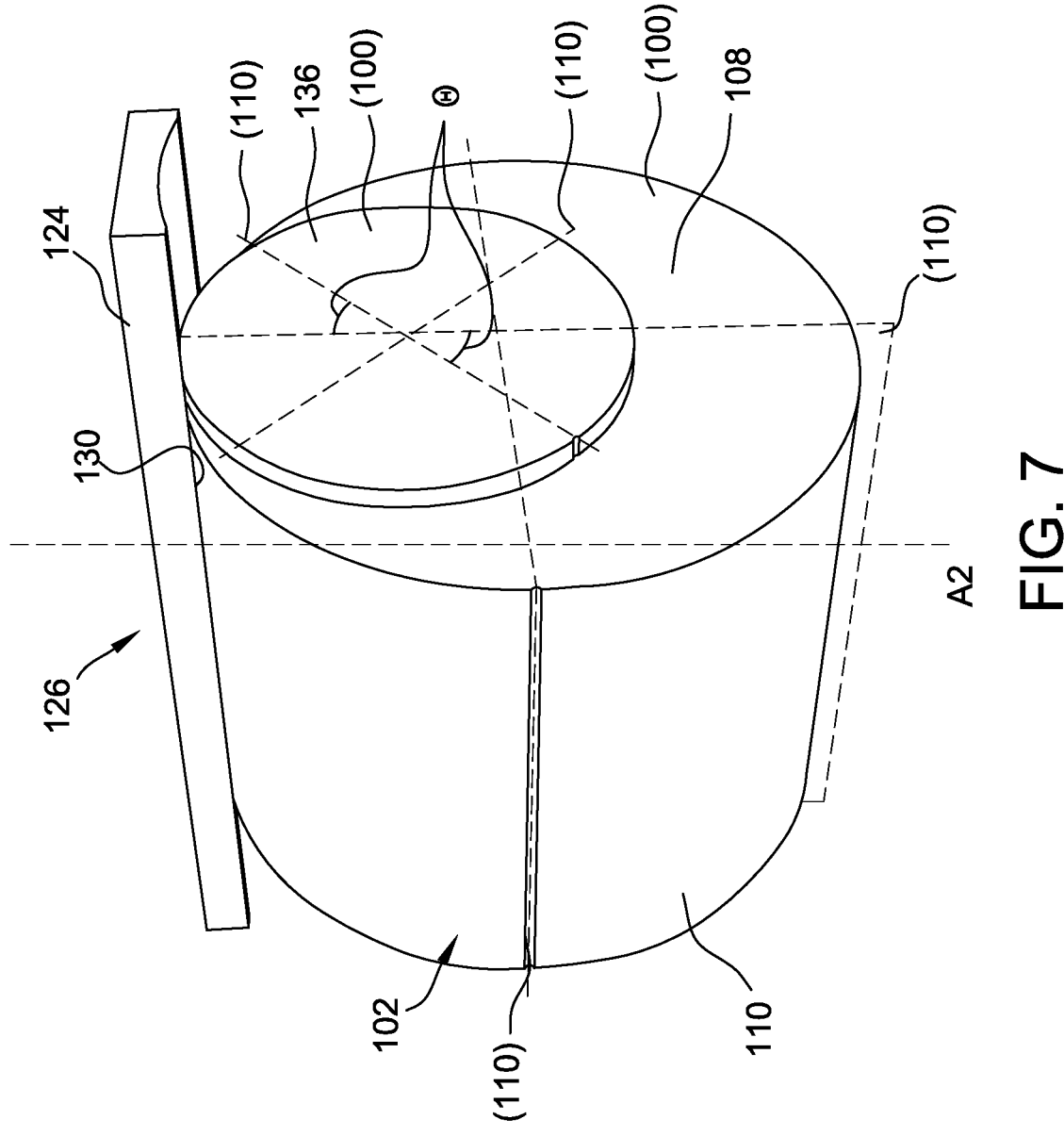
FIG. 7 is a perspective of the ingot and the sacrificial disks where cleavage planes of the disks are positioned offset from the cleavage planes of the ingot.

FIG. 7 shows an example where the cleavage (110) crystal planes of the disks 134 and 136 (only the disk 136 is shown in FIG. 7) are offset from the cleavage planes of the ingot 102, and the movement axis $A_2$, at an oblique angle θ. The oblique angle θ may be any suitable offset angle to enable the sacrificial disks 134 and 136 to function as described and/or to reduce the propensity of the disks to break during a slicing operation. For example, the cleavage planes of the sacrificial disks may be positioned at the angle θ of between approximately 10° to approximately 80°, between approximately 20° to approximately 70°, between approximately 30° to approximately 60°, or between approximately 40° to approximately 50°, relative to the cleavage planes of the ingot 102 and the movement axis $A_2$. The angle θ may be, for example, approximately 10°, approximately 15°, approximately 20°, approximately 25°, approximately 30°, approximately 35°, approximately 40°, approximately 45°, approximately 50°, approximately 55°, approximately 60°, approximately 65°, approximately 70°, approximately 75°, or approximately 80°, relative to the cleavage planes of the ingot 102 and the movement axis $A_2$. The cleavage planes of the sacrificial disk 134 may be positioned at the same offset angle θ as the cleavage planes of the sacrificial disk 136, or the cleavage planes of the sacrificial disk 134 may be positioned at a different offset angle as the cleavage planes of the sacrificial disk 136.

Advantageously, examples described in this disclosure include sacrificial disks that reduce the propensity of wafers to break and prematurely fall off an ingot during a wire saw slicing operation. Wafer breakage during wire saw processes reduces the number of wafers that are able to be produced from the ingot, creates manufacturing inefficiencies, increases costs, and otherwise results in unacceptable yield loss. The systems and methods described that include the sacrificial disks positioned adjacent respective longitudinal ends of the ingot facilitate increasing the number of wafers produced from the slicing operation that are suitable for use in subsequent processing and device fabrication, which reduces manufacturing inefficiencies and costs, and increases yield. Moreover, the sacrificial disks may suitably be made of a semiconductor material (e.g., silicon) that provides greater rigidity to the disks and better support to the longitudinal end wafers. The semiconductor material may suitably be compatible with a slurry used during the slicing operation to enable the slurry to be recycled for subsequent slicing operations. Single crystal semiconductor material (e.g., single crystal silicon) may suitably be used for the sacrificial disks to reduce any impurities that may be introduced into the single crystal ingot.

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", "horizontal", "vertical", "lateral", etc.) is for convenience of description and does not require any particular orientation of the item described.

As various changes could be made in the above constructions and methods without departing from the scope of the disclosure, all matter contained in the above description and shown in the accompanying drawing [s] shall be interpreted as illustrative and not in a limiting sense.

What is claimed is:

1. A system for slicing wafers from a monocrystalline semiconductor ingot, the system comprising:
   the monocrystalline semiconductor ingot;
   a wire saw including a wire web and wire guides operable to drive the wire web during a slicing operation;
   a bond beam connected to the wire saw, the wire saw operable to move the bond beam towards the wire web during the slicing operation to slice the wafers from the ingot;
   the monocrystalline semiconductor ingot comprising longitudinal end faces and a circumferential edge extending between the longitudinal end faces, the ingot attached to the bond beam along the circumferential edge; and
   two sacrificial disks, wherein one sacrificial disk is positioned adjacent each of the longitudinal end faces of the ingot to inhibit uncontrolled breakage of the wafers during the slicing operation, wherein the ingot has an outer ingot diameter and the sacrificial disks each have an outer disk diameter that is smaller than the outer ingot diameter, wherein an outer circumferential edge of each sacrificial disk is attached to the bond beam such that each sacrificial disk is axially offset from a longitudinal axis of the adjacent longitudinal end face.

2. The system of claim 1, wherein the sacrificial disks are made of semiconductor material.

3. The system of claim 1, wherein each sacrificial disk is adhered to the adjacent longitudinal end face with an adhesive.

4. The system of claim 1, wherein each sacrificial disk is adhered to the bond beam with an adhesive.

5. The system of claim 1, wherein the monocrystalline semiconductor ingot is a monocrystalline silicon ingot.

6. The system of claim 5, wherein the monocrystalline silicon ingot has a (110) crystal plane positioned perpendicular to a movement direction of the ingot towards the wire web.

7. The system of claim 6, wherein the wafers sliced from the monocrystalline silicon ingot are (100) monocrystalline silicon wafers.

8. The system of claim 7, wherein the sacrificial disks are made of monocrystalline silicon.

9. The system of claim 8, wherein at least one of the sacrificial disks has a (110) crystal plane positioned at an oblique angle to the movement direction.

10. The system of claim 9, wherein the at least one of the sacrificial disks has the (110) crystal plane positioned at an angle of between 30° to 60° to the movement direction.

11. The system of claim 9, wherein the at least one of the sacrificial disks has the (110) crystal plane positioned at an angle of 45° to the movement direction.

12. The system of claim 8, wherein each of the sacrificial disks has a (110) crystal plane positioned at an oblique angle to the movement direction.

13. The system of claim 12, wherein each of the sacrificial disks has the (110) crystal plane positioned at an angle of between 30° to 60° to the movement direction.

14. The system of claim 12, wherein each of the sacrificial disks has the (110) crystal plane positioned at an angle of 45° to the movement direction.

15. The system of claim 1, wherein the sacrificial disks each have a thickness of greater than 500 μm.

16. The system of claim 15, wherein the sacrificial disks each have the thickness of greater than 800 μm.

17. The system of claim 1, wherein the sacrificial disks each have a thickness of between 500 μm to 2000 μm.

18. The system of claim 1, wherein the sacrificial disks each have a thickness of between 800 μm to 1600 μm.

19. The system of claim 1, wherein each of the sacrificial disks has a different outer disk diameter.

20. The system of claim 1, wherein each of the sacrificial disks has an outer disk diameter of between 150 mm and 250 mm and the ingot has an outer ingot diameter of between 300 mm and 450 mm.

* * * * *